United States Patent
Yamauchi

[11] Patent Number: 5,509,516
[45] Date of Patent: Apr. 23, 1996

[54] VISCOUS FLUID COUPLING

[75] Inventor: Tsunekazu Yamauchi, Aichi, Japan

[73] Assignee: Aisin Seiki Kabushiki Kaisha, Kariya, Japan

[21] Appl. No.: 292,768

[22] Filed: Aug. 19, 1994

[30] Foreign Application Priority Data

Aug. 20, 1993 [JP] Japan ................ 5-206337

[51] Int. Cl.⁶ .................................................. F16D 35/02
[52] U.S. Cl. ........................ 192/58.682; 192/58.684; 192/82 T
[58] Field of Search ............... 192/58 B, 82 T, 192/58.684, 58.682

[56] References Cited

U.S. PATENT DOCUMENTS

| | | | |
|---|---|---|---|
| 4,054,193 | 10/1977 | Streeter. | |
| 4,705,149 | 11/1987 | Clancey | 192/58 B |
| 4,735,300 | 4/1988 | Brown | 192/58 B |
| 5,062,514 | 11/1991 | Kennedy et al. | 192/82 T |

FOREIGN PATENT DOCUMENTS

| | | |
|---|---|---|
| 0097423 | 1/1984 | European Pat. Off. . |
| 0106581 | 4/1984 | European Pat. Off. . |
| 0201242 | 12/1986 | European Pat. Off. . |
| 3-234931 | 10/1991 | Japan . |

*Primary Examiner*—Richard M. Lorence
*Attorney, Agent, or Firm*—Oblon, Spivak, McClelland, Maier & Neustadt

[57] ABSTRACT

A viscous fluid coupling includes a labyrinth device for transmitting rotational torque from an input member to an output member through viscous fluid and a temperature sensing bi-metal spiral spring element for controlling a flow of the viscous fluid toward the labyrinth device. A part of the spring element located outside with respect to a part for supporting a concentrated part of the stress in the spring element is welded to a holder plate.

6 Claims, 4 Drawing Sheets

VISCOUS FLUID COUPLING

BACKGROUND OF THE INVENTION

The present invention relates to a viscous fluid coupling for transmitting rotational torque from an input member to an output member through viscous fluid, and more particularly to a viscous fluid coupling employed in a radiator cooling fan drive mechanism of a vehicle engine.

A conventional viscous fluid coupling is seen in Japanese Patent Laid-Open (KOKAI) publication No. 234931/1991 and includes an input member having a rotatable shaft and a rotatable disc-shaped rotor secured to the shaft; an output member rotatable with respect to an axis of the shaft and having a casing rotatably supported on the shaft and a cover secured at it's outer periphery to the casing to define a hollow interior space, the rotor being housed in the hollow interior space; a partition plate positioned in the hollow interior space between the cover and the rotor for dividing the hollow interior space into a working chamber and a fluid storage chamber, the partition plate secured to the cover and having apertures for allowing the viscous fluid to flow from the storage chamber to the working chamber; a valve plate for closing and opening the apertures formed in the partition plate and secured on a rod which is supported on the cover; a temperature responsive bi-metal spiral spring element secured to the rod for actuating the valve plate to a position to open the apertures formed in the partition plate and a position to close the apertures formed in the partition plate; labyrinth device provided at least between the rotatable rotor and the casing for transferring rotation of the rotor to the casing; and a holder plate secured to the cover and fixedly holding an outer periphery of the spiral spring element.

In this prior case, a welding point to secure the bi-metal spiral spring element to the holder plate is located near a part of the spiral spring element which will be subjected to a concentrated stress. A disadvantage in this type of coupling is the decrease in the strength of the bi-metal spiral spring element due to thermal effect of the welding process.

Specifically, the location of the welding point near the concentrated part of the stress in the bi-metal spiral spring element will amplify such a disadvantage.

SUMMARY OF THE INVENTION

It is therefore an object of the present invention to provide a viscous fluid coupling having a new construction for holding a bi-metal spiral spring element to a holder plate.

A further object of the present is to provide a viscous fluid coupling having a welding point to secure a hi-metal spiral spring element to a holder plate, which is located outside with respect to a point for supporting a concentrated part of a stress in the bi-metal spiral spring element.

According to the present invention, the above and other objects can be accomplished by a viscous fluid coupling comprising; an input member having a rotatable shaft and a rotatable disc-shaped rotor secured to the shaft; an output member rotatable with respect to an axis of the shaft and having a casing rotatably supported on the shaft and a cover secured at its outer periphery to the casing to define a hollow interior space, the rotor being housed in the hollow interior space; a partition plate positioned in the hollow interior space between the cover and the rotor for dividing the hollow interior space into a working chamber and a fluid storage chamber, the partition plate secured to the cover and having apertures for allowing the viscous fluid to flow from the storage chamber to the working chamber; a valve plate for closing and opening the apertures formed in the partition plate and secured on a rod which is supported on the cover; a temperature responsive bi-metal spiral spring element secured to the rod for actuating the valve plate to a position to open the apertures formed in the partition plate and a position to close the apertures formed in the partition plate; and labyrinth device provided at least between the rotatable rotor and the casing for transferring rotation of the rotor to the casing; the bi-metal spiral spring having a radially extending portion at its outer periphery and a tip end portion thereof being welded to a part of a holder plate secured to the cover.

According to the features of the present invention, the holder plate includes an axially extending flange portion and a C-shaped portion in section integral therewith, the radially extending portion of the spiral spring element being inserted in slots formed in the flange portion and the C-shaped portion and welded to a segment of the C-shaped portion which is located most-outside thereof. Further, a part of the spiral spring element which will be subjected to a concentrated stress and away from the welding part is supported at least by the flange portion of the holder plate.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE EMBODIMENT

Figure 1:
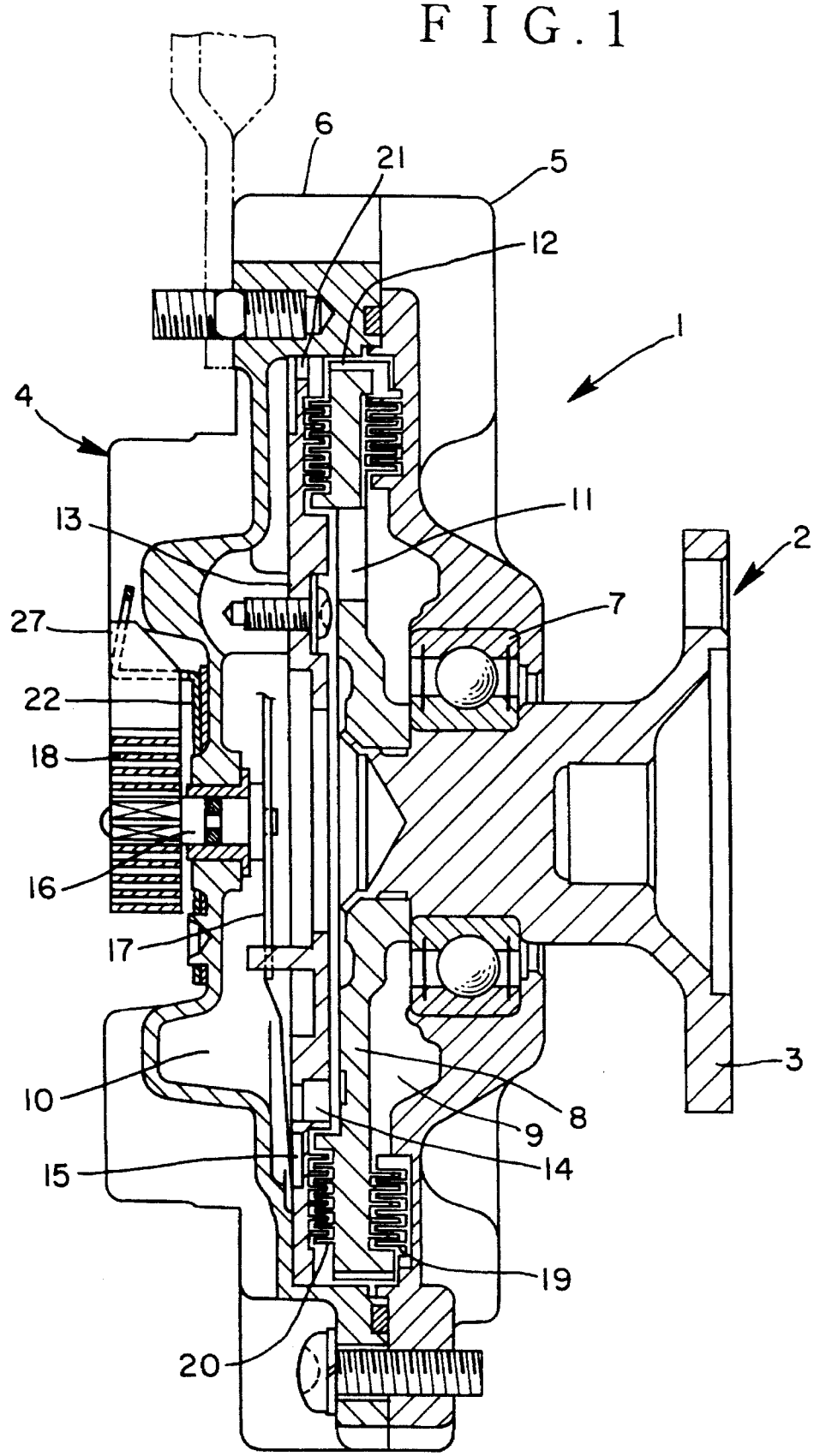
FIG. 1 is a sectional view of a viscous fluid coupling in accordance with one embodiment of the present invention.
Figure 2:
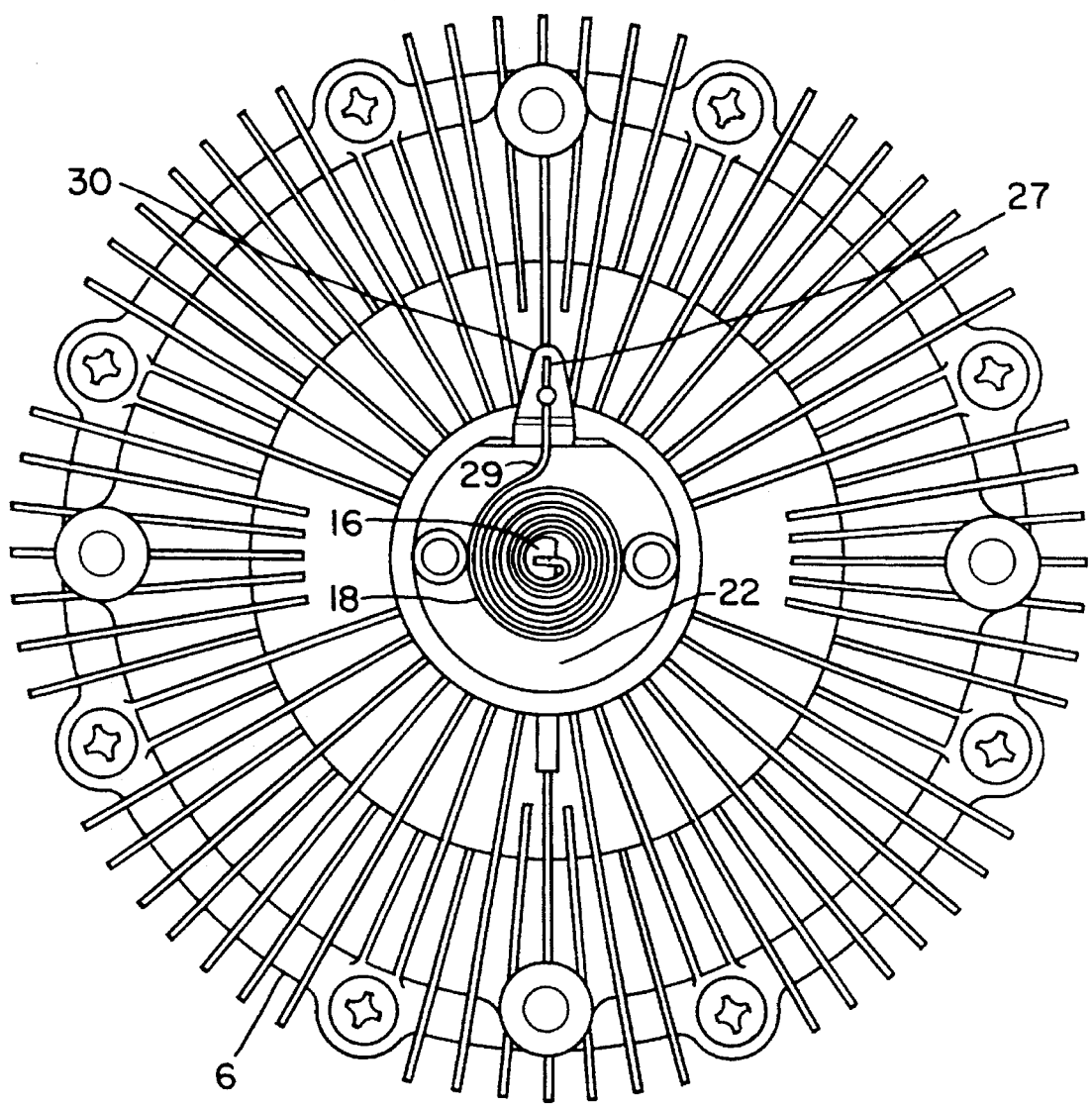
FIG. 2 is a front view of the coupling illustrated in FIG. 1.
Figure 3:
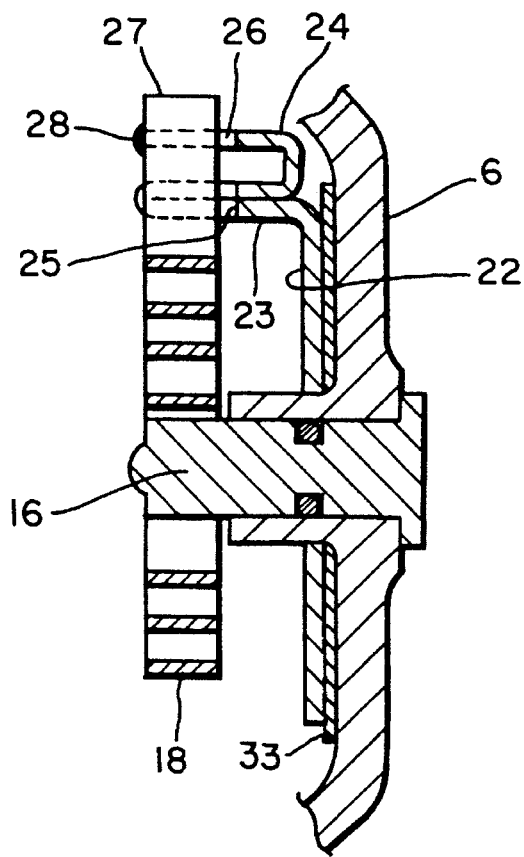
FIG. 3 is a sectional view of a bi-metal spring element adopted in the coupling.
Figure 4:
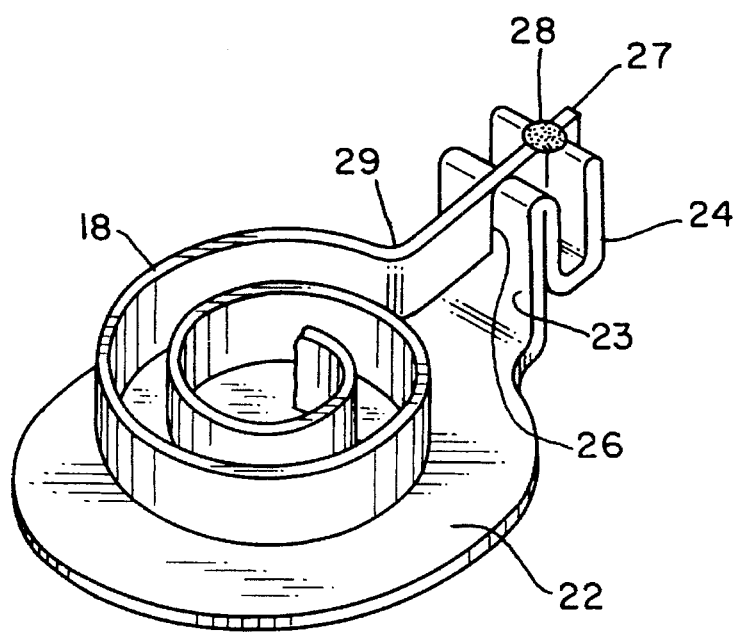
FIG. 4 is a schematic view of the bi-metal spiral spring element of FIG. 3.

A viscous fluid coupling 1 according to the present invention includes an input member 2 having an input shaft 3 which may be driven by a pully (not shown) connected through a belt with a crank shaft of the engine, and an output member 4 having a casing 5 and a cover 6 secured to the casing 5 at its diametrically outward portions to define a hollow interior space. The casing 5 is supported at its inner periphery rotatably on the shaft 3 through a bearing 7. A disc-shaped rotor 8 is secured to one end of the shaft 3 and provided with at least two passages 11, 12.

In the cover 6, there is a disc-shaped partition plate 13 which divides the hollow interior space into a working chamber 9 and a fluid storage chamber 10 and is secured to an inner surface of the cover 6. The partition plate 13 is formed with a plurality of apertures 14, 15. The apertures 14, 15 will assist in supplying the viscous fluid in the storage chamber 10 to a space in the working chamber 9.

A rod 16 rotatably supported on the cover 6 is provided with a valve plate 17 and a temperature responsive hi-metal spiral spring element 18. The bi-metal spring element 18 normally functions to maintain the valve plate 17 at a position to close the apertures 14, 15. When the temperature such as an engine cooling medium temperature increases beyond a predetermined value, the bi-metal spring element 18 rotates the valve plate 17 to a position to open the apertures 14, 15, thereby establishing a communication between the storage chamber 10 and the working chamber 9 through the apertures 14, 15.

The surface of the casing 5 of the output member 4 and the rear surface of the rotor 8 of the input member 2 are provided with a labyrinth device 19 in the form of a plurality of lands and grooves, respectively, to transmit torque from the input member 2 to the output member 4. Further, the forward surface of the rotor 8 and the surface of the partition plate 13 are provided with another labyrinth device 20 in the form of a plurality of lands and grooves.

The partition plate 13 is provided at its outer peripheral portions with pumping mechanism 21 to expell the viscous fluid from the labyrinth devices 19, 20 toward the storage chamber 10.

Where the coupling 1 is used to rotate fan blades secured to the cover 6 and provides a flow of cooling air through a radiator in an engine cooling system, the bi-metal spring element 18 is located near the radiator or the engine. Therefore, when the engine is operated under a cold state, the valve plate 17 will close the apertures 14, 15 in the partition plate 13 due to non-actuation of the bi-metal spring element 18, so that the fluid in the storage chamber 10 is not supplied into the working chamber 9 and the substantial part of the fluid in the working chamber 9 is expelled by the rotor 8 and the pumping mechanism 21. A small amount of the fluid remains in the working chamber 9 so that the output member 4 is rotated at a slow speed. When the engine temperature increases beyond the predetermined level, the bi-metal spring element 18 causes to rotate the valve plate 17 to the position to open the apertures 14, 15 in the partition plate 13, so that a flow of the fluid is continuously supplied from the storage chamber 10 to the working chamber 9 through the apertures 14, 15 and the output member 4 of the coupling 1 is rotated at a high speed by means of the labyrinth devices 19, 20.

According to a feature of the present invention, the improvement is made to the temperature sensing bi-metal spring element 18. A disc-shaped holder plate 22 is press-fitted on a central hub of the cover 6 and has an axially extending flange portion 23. The flange portion 23 further has a C-shaped portion 24 in section which is integrally formed with the flange portion 23, for example, by folding back a part thereof. The flange portion 23 and the C-shaped portion 24 are provided with cutout portions or slots 25, 26, respectively.

The temperature responsive bi-metal spiral spring element 18 has a radially outwardly extending portion 27 which is inserted into the slots 25, 26. A segment 28 of the C-shaped portion 24, which is located most outside with respect to the flange portion 23 is welded to the radially outwardly extending portion 27 of the spiral spring element 18. A curved portion 29 of the spiral spring element 18 on which a concentrated load is exerted is supported by the flange portion 23 and the inside segment of the C-shaped portion 24.

Figure 5:
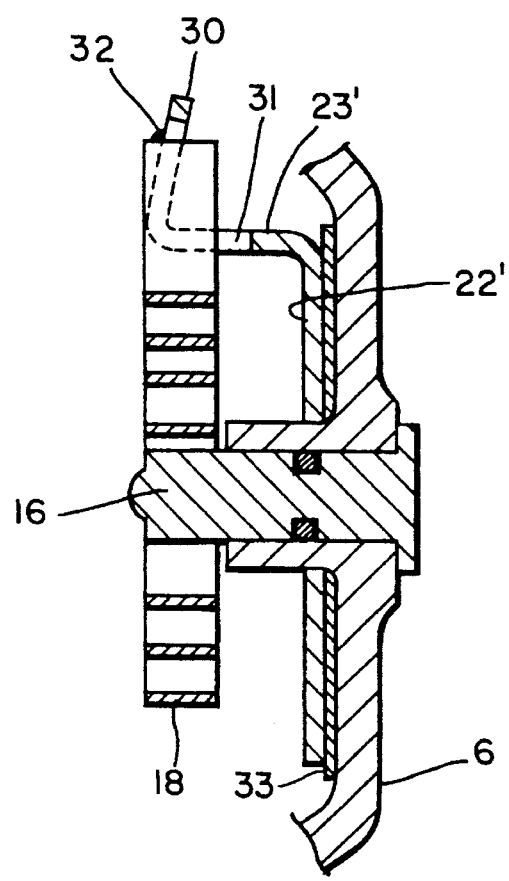
FIG. 5 is a sectional view of another embodiment of a bi-metal spiral spring element.
Figure 6:
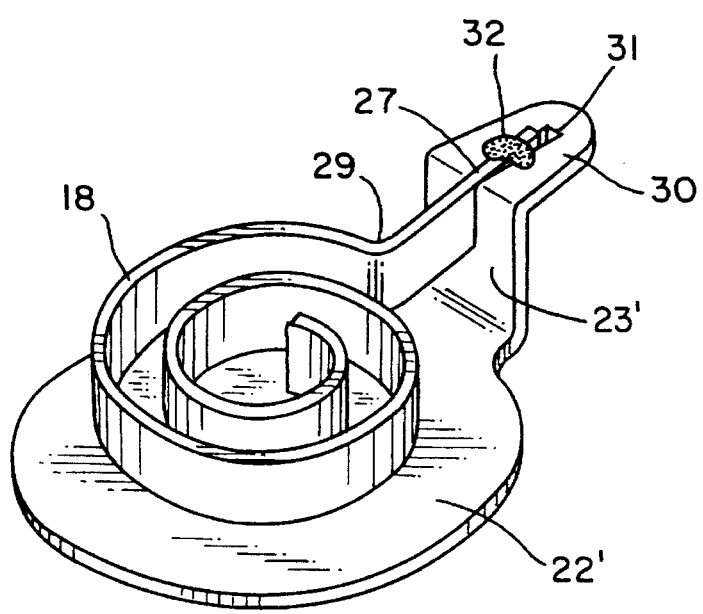
FIG. 6 is a schematic view of the bi-metal spiral spring element of FIG. 5.

FIGS. 5 and 6 show another embodiment of a holder plate 22' which has an axially extending flange portion 23' and an upright portion 30. A slot 31 is formed on both the portions 23', 30 for receiving the radially extending portion 27 of the spiral spring element 18 so that the part of the spiral spring element 18 which will be subjected to the concentrated stress is supported by the flange portion 23'. The diametrically outward portion 32 of the radially extending portion 27 of the spiral spring element 27 is welded to the upright portion 30.

It will be noted that the upper portion of the radially extending portion 27 of the spiral spring element 18, which is located outside with respect to the curved portion 29 thereof and away therefrom, is welded to the part of the holder plate 22, 22'. The part of the radially extending portion 27, which will be subjected to the concentrated load is supported at least by the flange portion 23, 23' of the holder plate 22, 22' without a welding process. Therefore, it is possible to prevent the decrease in a strength of the bi-metal spiral spring element 18 due to a thermal effect of the welding process.

A thermal isolating member 33 interposed between the holder plate 22, 22' and the cover 6 functions not to transfer a heat in the working chamber 9 to the bi-metal spiral spring element 18.

Although certain preferred embodiments have been shown and described, it should be understood that many changes and modifications may be made therein without departing from the scope of the appended claims.

I claim:

1. A viscous fluid coupling comprising:

an input member having a rotatable shaft and a rotatable disc-shaped rotor secured to the shaft;

an output member rotatable with respect to an axis of the shaft and having a casing rotatably supported on the shaft and a cover secured at its outer periphery to the casing to define a hollow interior space, the rotor being housed in the hollow interior space;

a partition plate positioned in the hollow interior space between the cover and the rotor for dividing the hollow interior space into a working chamber and a fluid storage chamber, the partition plate secured to the cover and having apertures for allowing the viscous fluid to flow from the storage chamber to the working chamber;

a valve plate for closing and opening the apertures formed in the partition plate and secured on a rod which is supported on the cover;

a temperature responsive bi-metal spiral spring element secured to the rod for actuating the valve plate to a position to open the apertures formed in the partition plate and a position to close the apertures formed in the partition plate;

a labyrinth device provided at least between the rotatable rotor and the casing for transferring rotation of the rotor to the casing; and a holder plate secured to the cover and having an axially extending flange portion and a radially outwardly extending portion integral therewith;

the bi-metal spiral spring element having a radially extending portion at its outer periphery and a tip end portion thereof, the radially extending portion of the spiral spring element being inserted in slots formed in the flange portion and the radially outwardly extending portion, and the tip end portion being welded to the radially outwardly extending portion.

2. A viscous fluid coupling according to claim 1, wherein the holder plate is provided with a C-shaped portion in section as the radially outwardly extending portion, and the tip end portion of the bi-metal spring element is welded to a segment of the C-shaped portion which is located most-outside thereof.

3. A viscous fluid coupling according to claim 2, wherein a part of the spiral spring element which will be subjected to a concentrated stress and away from the welding part is supported at least by the flange portion of the holder plate.

4. A viscous fluid coupling according to claim 1, wherein the holder plate is provided with an upright portion as the radially outwardly extending portion, and the tip end portion of the bi-metal spring element is welded to the upright portion.

5. A viscous fluid coupling comprising:

an input member having a rotatable shaft and a rotatable disc-shaped rotor secured to the shaft;

an output member rotatable with respect to an axis of the shaft and having a casing rotatably supported on the shaft and a cover secured at its outer periphery to the casing to define a hollow interior space, the rotor being housed in the hollow interior space;

a partition plate positioned in the hollow interior space between the cover and the rotor for dividing the hollow interior space into a working chamber and a fluid storage chamber, the partition plate secured to the cover and having apertures for allowing the viscous fluid to flow from the storage chamber to the working chamber;

a valve plate for closing and opening the apertures formed in the partition plate and secured on a rod which is supported on the cover;

a temperature responsive bi-metal spiral spring element secured to the rod for actuating the valve plate to a position to open the apertures formed in the partition plate and a position to close the apertures formed in the partition plate; and a labyrinth device provided at least between the rotatable rotor and the casing for transferring rotation of the rotor to the casing;

the bi-metal spiral spring element having a radially extending portion at its outer periphery and a tip end portion thereof being welded to a part of a holder plate secured to the cover, the holder plate including an axially extending flange portion and an upright portion integral therewith, the radially extending portion of the spiral spring element being inserted in slots formed in the flange portion and the upright portion, and the tip end portion thereof being welded to the upright portion of the holder plate.

6. A viscous fluid coupling according to claim 4, wherein a part of the spiral spring element which will be subjected to a concentration stress and away from the welding part is supported by the flange portion of the holder plate.

* * * * *